(12) United States Patent
Wang

(10) Patent No.: US 11,658,694 B1
(45) Date of Patent: May 23, 2023

(54) CELL PHONE CASE WITH MULTIFUNCTIONAL HOLDER

(71) Applicant: SHENZHEN FACBINY TECHNOLOGY CO., LTD., Shenzhen (CN)

(72) Inventor: Shenggang Wang, Ziyang (CN)

( * ) Notice: Subject to any disclaimer, the term of this patent is extended or adjusted under 35 U.S.C. 154(b) by 0 days.

(21) Appl. No.: 17/984,318

(22) Filed: Nov. 10, 2022

(30) Foreign Application Priority Data

Dec. 6, 2021 (CN) .......................... 202123047644.0

(51) Int. Cl.
*H04B 1/3877* (2015.01)
*H04M 1/04* (2006.01)
*H04B 1/3888* (2015.01)

(52) U.S. Cl.
CPC ......... *H04B 1/3877* (2013.01); *H04B 1/3888* (2013.01); *H04M 1/04* (2013.01)

(58) Field of Classification Search
CPC ...... H04B 1/3877; H04B 1/3888; H04M 1/04
See application file for complete search history.

(56) References Cited

U.S. PATENT DOCUMENTS

| | | | |
|---|---|---|---|
| 10,419,054 B1* | 9/2019 | VanTassell | H04M 1/04 |
| 10,581,480 B1* | 3/2020 | Kim | A45F 5/00 |
| 10,784,914 B1* | 9/2020 | Kim | H04M 1/725 |
| 2014/0355200 A1* | 12/2014 | Thiers | H04M 1/04 361/679.41 |
| 2018/0332153 A1* | 11/2018 | Brown | H04M 1/04 |
| 2019/0058782 A1* | 2/2019 | Lee | H04M 1/04 |
| 2019/0097666 A1* | 3/2019 | Qi | A45F 5/021 |
| 2019/0230205 A1* | 7/2019 | Lee | H04B 1/3888 |
| 2019/0268457 A1* | 8/2019 | Liu | H04M 1/12 |
| 2020/0297103 A1* | 9/2020 | Jang | A45F 5/10 |
| 2021/0116066 A1* | 4/2021 | Tsui | F16M 11/38 |
| 2021/0250435 A1* | 8/2021 | Chen | H04B 1/3888 |
| 2021/0385316 A1* | 12/2021 | Douglas | F16M 11/041 |

* cited by examiner

*Primary Examiner* — Jinsong Hu
*Assistant Examiner* — Rui M Hu
(74) *Attorney, Agent, or Firm* — Daniel M. Cohn; Howard M. Cohn

(57) ABSTRACT

A cell phone case with multifunctional holder includes a housing, a rotating nail, and a metal gasket. The rotating nail is capable of freely rotating on the housing, a ring holder disposed on an outer side of the housing is arranged on the rotating nail, a supporting sheet is disposed on the ring holder. A fixing socket, a movable lock accommodating part, and a first spring limit opening are defined in the ring holder; the movable lock is disposed in the movable lock accommodating part, and the boss is capable of protruding from an outer side surface of the housing. A spring is disposed between the first spring limit opening of the movable lock accommodating part and the second spring limiting opening of the movable lock, the boss is configured to cooperate with the fixed socket to limit the ring holder onto the housing.

2 Claims, 5 Drawing Sheets

CELL PHONE CASE WITH MULTIFUNCTIONAL HOLDER

TECHNICAL FIELD

The present disclosure relates to a technical field of cell phone cases, in particular to a cell phone case with multifunctional holder.

BACKGROUND

With the development of science and technology, many new technologies and new functions, such as wireless charging function, for cell phones have appeared in the technical field of the cell phones, which brings convenience and speed to people. However, cell phone cases with ring holders currently available on the market cannot meet the actual needs of the people since the ring holders are so small that wireless charging for the cell phones is limited.

SUMMARY

In order to solve the problems in the prior arts, the present disclosure provides a cell phone case with multifunctional holder.

The technical schemes provided by the present disclosure are as following.

The present disclosure provides a cell phone case with multifunctional holder, including a housing. A rotating opening is defined in the housing, the rotating opening is configured to receive a rotating nail, the rotating nail extends into a part of an inner side of the housing to rivet with a metal gasket so that the rotating nail is capable of freely rotating on the housing, two shaft holes are defined in the rotating nail, a ring holder disposed on an outer side of the housing is arranged on the rotating nail, a shaft penetrates through the two shaft holes for connecting a torsion spring with the ring holder so that the ring holder is capable of flipping outward with respect to the housing and freely rotating along with the rotating nail, a first end of the torsion spring abuts against the rotating nail, a second end abuts against the ring holder; a supporting sheet is disposed on the ring holder; and a fixing socket is further defined in the ring holder. A movable lock accommodating part and a first spring limit opening are defined at a position on the inner side of the housing with respect to the fixing socket, a second spring limit opening is defined in a movable lock and a boss configured to cooperate with the fixing socket is further disposed on the movable lock, the movable lock is disposed in the movable lock accommodating part, and the boss is capable of protruding from an outer side surface of the housing. A spring is disposed between the first spring limit opening of the movable lock accommodating part and the second spring limiting opening of the movable lock, the movable lock and the spring are limited inside the movable lock accommodating part by a first blocking sheet. The boss is configured to cooperate with the fixing socket to limit the ring holder onto the housing. When in use, the movable lock is stressed to move, so that the boss is relatively displaced and separated with the fixing socket for releasing the ring holder.

Furthermore, the inner side of the housing configured to dispose the rotating nail is blocked by a second blocking sheet.

Beneficial effects of the present disclosure are as following.

The cell phone case with multifunctional holder of the present disclosure solves a positioning problem for a wireless charger and a problem for firmly holding the wireless charger by providing the supporting sheet on the ring holder. Meanwhile a specific movable lock is provided for tightly fixing the ring holder to a groove on a back surface of the cell phone case to prevent the ring holder from unfolding by magnetic force of the wireless charger. Moreover, a design for sizes of the ring holder avoids signal transmission and reception areas, which solves a problem of wireless charging. When unlocking the movable lock, and the ring holder is popped off and may be rotated 360 degrees to support the cell phone, which is easy to use and realizes multi-functions of the ring holder.

DETAILED DESCRIPTION OF PREFERRED EMBODIMENTS

Below in conjunction with the accompanying drawings, the present disclosure is described in further detail.

Figure 1:
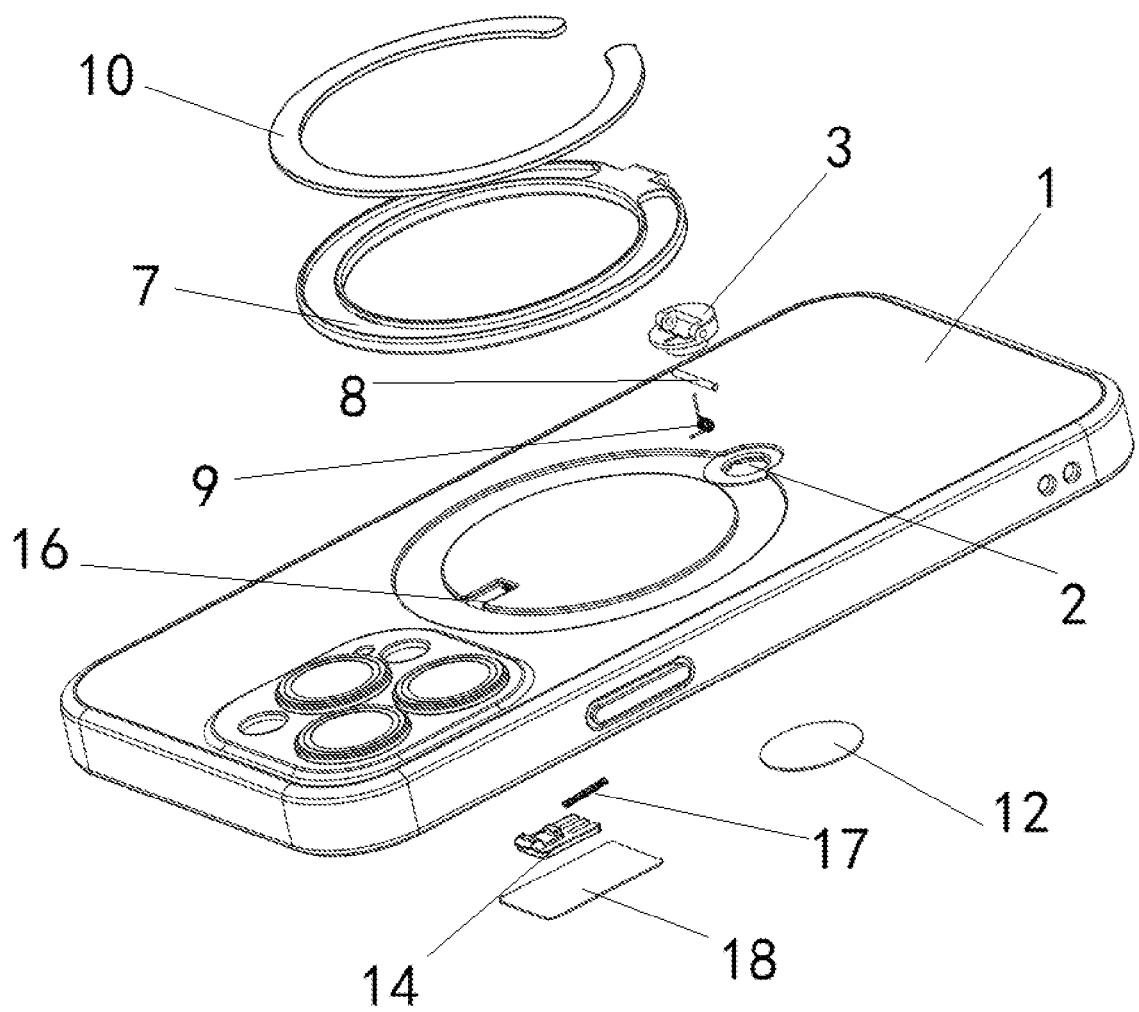
FIG. 1 is an exploded structural schematic diagram of an outer side view of a cell phone case with multifunctional holder of the present disclosure.
Figure 2:
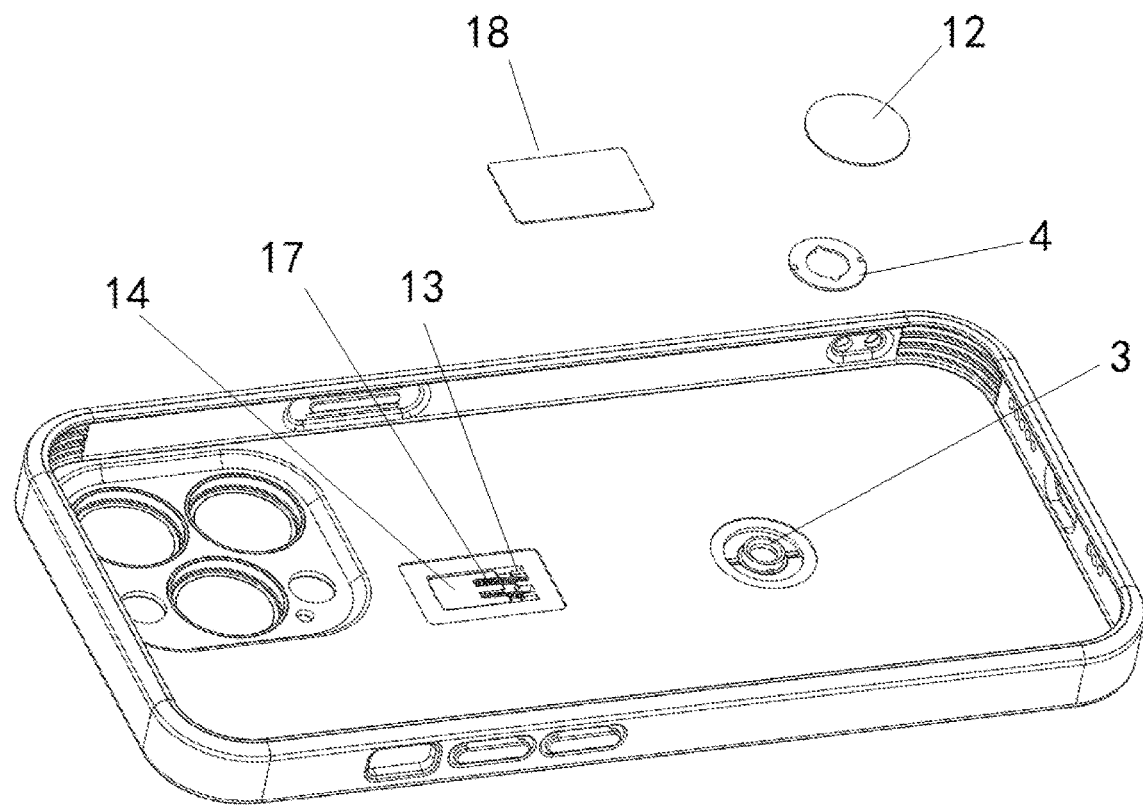
FIG. 2 is an exploded structural schematic diagram of an inner side view of the cell phone case with the multifunctional holder of the present disclosure.
Figure 3:
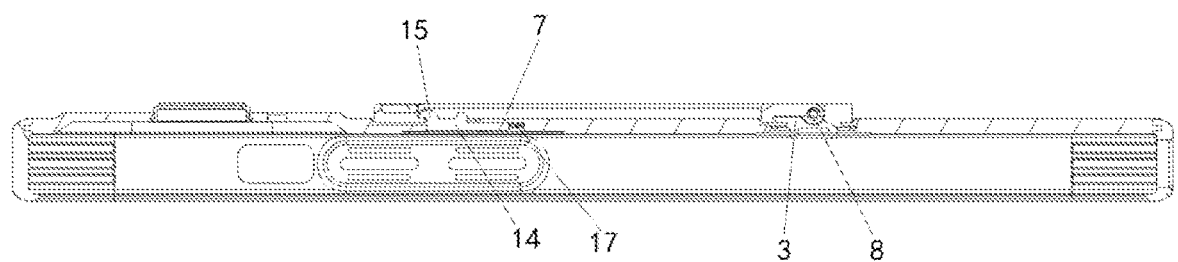
FIG. 3 is a cross-sectional schematic diagram of the cell phone case with the multifunctional holder of the present disclosure.
Figure 4:
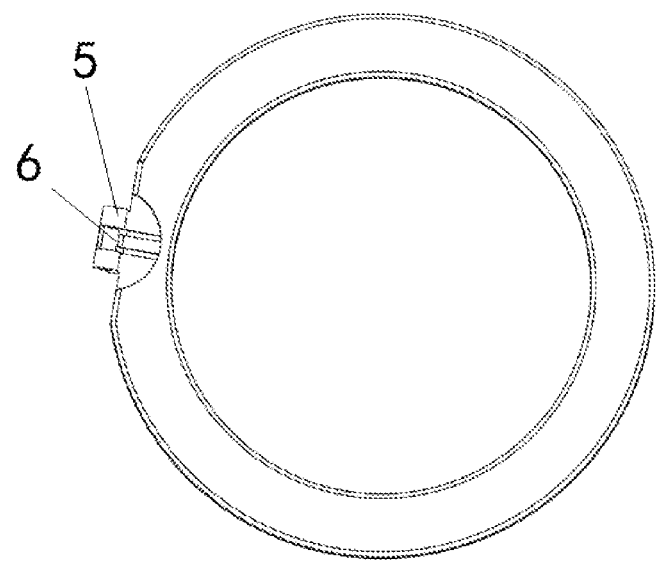
FIG. 4 is a structural schematic diagram of a ring holder of the cell phone case with the multifunctional holder of the present disclosure.
Figure 5:
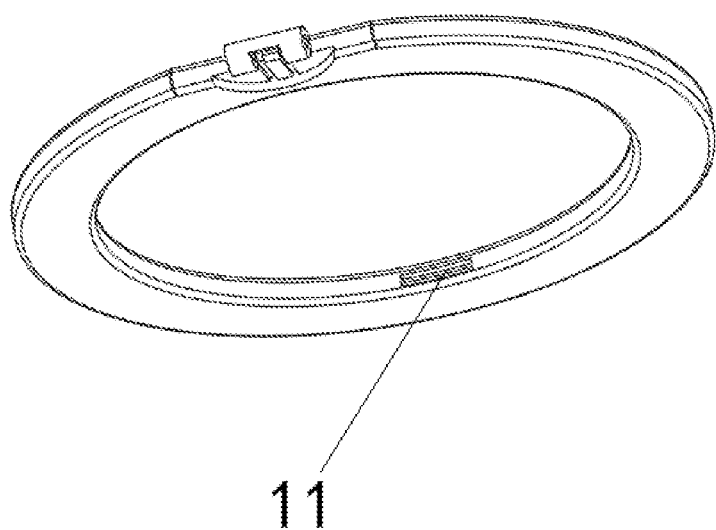
FIG. 5 is another structural schematic diagram of the ring holder of the cell phone case with the multifunctional holder of the present disclosure.

As shown in FIGS. 1 to 5, a cell phone case with multifunctional holder includes a housing 1. A rotating opening 2 is defined in the housing 1. The rotating opening 2 is configured to receive a rotating nail 3. A material of the rotating nail 3 may be selected from metals. The rotating nail 3 extends into a part of an inner side of the housing 1 to rivet with a metal gasket 4 so that the rotating nail 3 is capable of rotating on the housing 1. Here, the part of the inner side of the housing 1 mainly refers to an inner side surface configured to mount a cell phone thereon.

Two shaft holes are defined in the rotating nail 3. The two shaft holes are defined on opposite sides. A middle part of the rotating nail 3 is configured to receive a hinge 5 of the ring holder 7. A middle part of the hinge 5 is a torsion spring accommodating portion 6. A torsion spring 9 is disposed in the torsion spring accommodating portion 6. The ring holder 7 disposed on an outer side of the housing 1 is arranged on the rotating nail 3. A shaft 8 penetrates through the two shaft holes for connecting the torsion spring 9 with the ring holder 7 so that the ring holder 7 is capable of flipping outward with respect to the housing 1 and freely rotating along with the rotating nail 3. A first end of the torsion spring 9 abuts against the rotating nail 3, and a second end of the torsion spring 9 abuts against the ring holder 7. A supporting sheet 10 is disposed on the ring holder 7. The supporting sheet 10 is made of iron. A fixing socket 11 is further defined in the ring holder 7. The inner side of the housing 1 configured to dispose the rotating nail 3 is blocked by a second blocking sheet 12.

Figure 6:
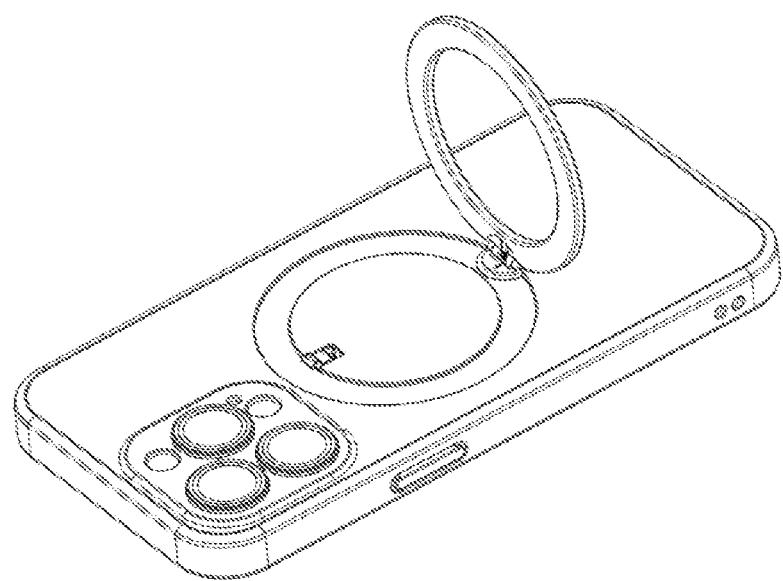
FIG. 6 is a schematic diagram of the cell phone case with the multifunctional holder of the present disclosure where the cell phone case with the multifunctional holder is in a first use state.
Figure 7:
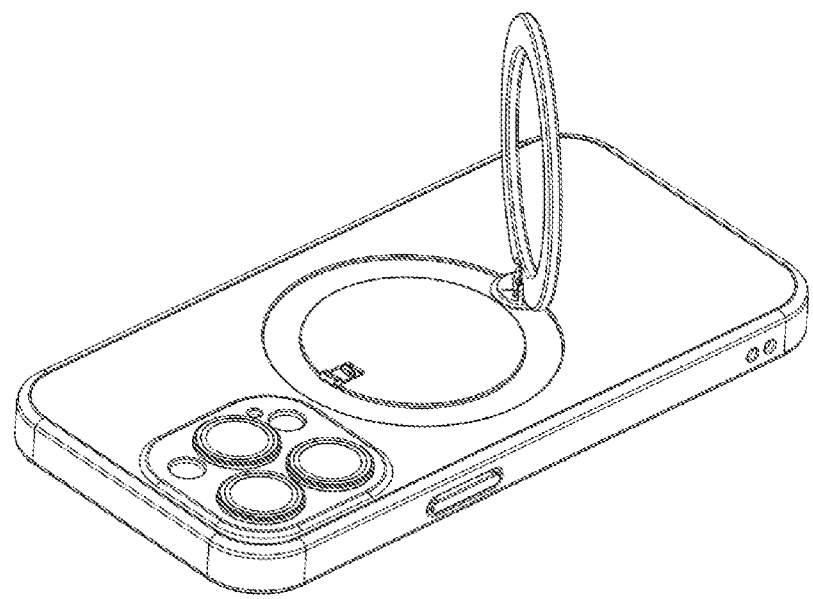
FIG. 7 is a schematic diagram of the cell phone case with the multifunctional holder of the present disclosure where the cell phone case with the multifunctional holder is in a second use state.
Figure 8:
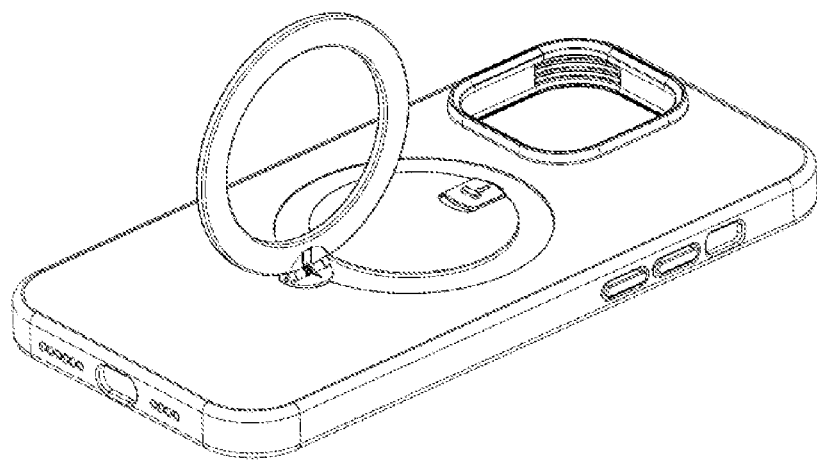
FIG. 8 is a schematic diagram of the cell phone case with the multifunctional holder of the present disclosure where the cell phone case with the multifunctional holder is in a third use state.
Figure 9:
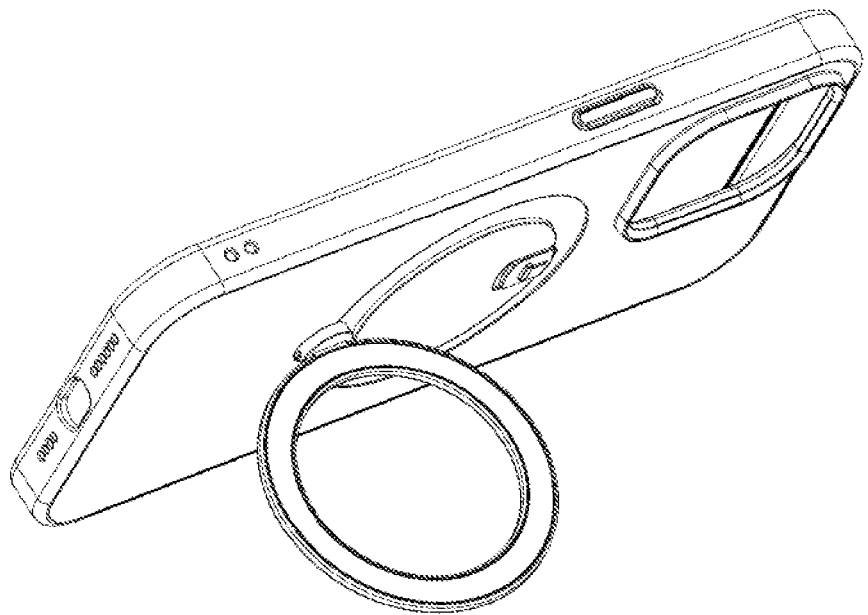
FIG. 9 is another schematic diagram of the cell phone case with the multifunctional holder of the present disclosure where the cell phone case with the multifunctional holder is in the third use state.

A movable lock accommodating part and a first spring limit opening 13 are defined at a position on the inner side of the housing 1 with respect to the fixing socket 11. A second spring limit opening is defined in a movable lock 14 and a boss 15 configured to cooperate with the fixing socket 11 is further disposed on the movable lock 14. An opening 16 for allowing the boss 15 to protrude from an outer side surface of the housing 1 is defined on the housing 1. The movable lock 14 is disposed in the movable lock accommodating part, and the boss 15 is capable of protruding from the outer side surface of the housing 1. A spring 17 is disposed between the first spring limit opening 13 of the movable lock accommodating part and the second spring limiting opening of the movable lock 14. The first spring limit opening 13 and the second spring limiting opening are defined as similar U-shaped grooves, two ends of the spring 17 are located between two of the U-shaped grooves and limited therebetween. The movable lock 14 is capable of moving back and forth in the movable lock accommodating part and may be returned by the spring 17. The movable lock 14 and the spring 17 are limited inside the movable lock accommodating part by a first blocking sheet 18. The boss 15 is configured to cooperate with the fixing socket 11 to limit the ring holder 7 onto the housing 1. When in use, the movable lock 14 is stressed to move, so that the boss 15 is relatively displaced and separated with the fixing socket 11 for releasing the ring holder 7. Use states of the present disclosure are shown in FIGS. 6-9, the ring holder may also be rotated 360 degrees to support the cell phone.

The present disclosure has been described in detail through preferred embodiments. However, variations and additions to the various embodiments will also be apparent to those of ordinary skill in the art from a study of the foregoing. It is the intention of the applicant that all such changes and additions fall within the scope of the claims of the present disclosure.

What is claimed is:

1. A cell phone case with multifunctional holder, comprising:
    a housing;
    wherein a rotating opening is defined in the housing, the rotating opening is configured to receive a rotating nail, the rotating nail extends into a part of an inner side of the housing to rivet with a metal gasket so that the rotating nail is capable of freely rotating on the housing; two shaft holes are defined in the rotating nail, a ring holder disposed on an outer side of the housing, is arranged on the rotating nail, a shaft penetrates through the two shaft holes for connecting a torsion spring with the ring holder so that the ring holder is capable of flipping outward with respect to the housing and freely rotating along with the rotating nail, a first end of the torsion spring abuts against the rotating nail, a second end abuts against the ring holder; a supporting sheet is disposed on the ring holder; and a fixing socket is further defined in the ring holder; and
    a movable lock accommodating part and a first spring limit opening are defined at a position on the inner side of the housing corresponding to the fixing socket, a second spring limit opening is defined in a movable lock and a boss configured to cooperate with the fixing socket is further disposed on the movable lock, the movable lock is disposed in the movable lock accommodating part, and the boss is capable of protruding from an outer side surface of the housing; a spring is disposed between the first spring limit opening of the movable lock accommodating part and the second spring limiting opening of the movable lock, the movable lock and the spring are limited inside the movable lock accommodating part by a first blocking sheet; the boss is configured to cooperate with the fixing socket to limit the ring holder onto the housing; when in use, the movable lock is stressed to move, so that the boss is relatively displaced and separated with the fixing socket for releasing the ring holder.

2. The cell phone case with multifunctional holder according to claim 1, wherein the inner side of the housing configured to dispose the rotating nail is blocked by a second blocking sheet.

* * * * *